(12) United States Patent
Gloystein et al.

(10) Patent No.: US 11,210,115 B2
(45) Date of Patent: Dec. 28, 2021

(54) DATA VISUALIZATION USER INTERFACE WITH SUMMARY POPUP THAT INCLUDES INTERACTIVE OBJECTS

(71) Applicant: Tableau Software Inc., Seattle, WA (US)

(72) Inventors: Ginger Gloystein, Seattle, WA (US); Sean Boon, Snoqualmie, WA (US); Bora Beran, Bothell, WA (US); Justin Talbot, Seattle, WA (US); Andrew Beers, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 921 days.

(21) Appl. No.: 15/436,691

(22) Filed: Feb. 17, 2017

(65) Prior Publication Data

US 2018/0129513 A1    May 10, 2018

Related U.S. Application Data

(60) Provisional application No. 62/418,244, filed on Nov. 6, 2016.

(51) Int. Cl.
*G06F 9/451* (2018.01)
*G06T 11/20* (2006.01)
*G06F 3/0484* (2013.01)
*G06F 16/26* (2019.01)

(52) U.S. Cl.
CPC .......... *G06F 9/453* (2018.02); *G06F 3/04842* (2013.01); *G06F 3/04845* (2013.01); *G06F 16/26* (2019.01); *G06T 11/206* (2013.01); *G06F 2203/04806* (2013.01); *G06T 2200/24* (2013.01)

(58) Field of Classification Search
CPC .................................. G06F 3/14; G06F 3/17
USPC .................................................. 715/708, 227
See application file for complete search history.

(56) References Cited

U.S. PATENT DOCUMENTS

| | | | |
|---|---|---|---|
| 2008/0046803 A1* | 2/2008 | Beauchamp | G06F 17/30563 715/212 |
| 2017/0116373 A1* | 4/2017 | Ginsburg | G06F 3/04817 |

\* cited by examiner

*Primary Examiner* — Ruay Ho
(74) *Attorney, Agent, or Firm* — Morgan, Lewis & Bockius LLP

(57) ABSTRACT

A method displays a first data visualization according to user placement of data fields in shelves of a user interface. Each shelf specifies a property of the data visualization and the data visualization includes visual data marks corresponding to data values for data fields in a dataset. A user selects a subset of the visual data marks. A popup summary is displayed that includes data value distributions for several data fields. In the popup summary, a second user input is detected corresponding to a first data field whose data value distribution is displayed in the popup summary. In response, the method displays a moveable icon corresponding to the first data field. The method detects a third user input to place the interactive moveable icon in a shelf in the user interface. In response, a second data visualization is displayed according to placement of data fields, including the first data field.

20 Claims, 9 Drawing Sheets

DATA VISUALIZATION USER INTERFACE WITH SUMMARY POPUP THAT INCLUDES INTERACTIVE OBJECTS

CROSS REFERENCE TO RELATED APPLICATIONS

This application claims priority to U.S. Provisional Patent Application 62/418,244, filed Nov. 6, 2016, entitled "Data Visualization User Interface with Summary Popup that Includes Interactive Objects," which is hereby incorporated by reference in its entirety.

TECHNICAL FIELD

The disclosed implementations relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface with such large or complex data sets.

SUMMARY

Accordingly, implementations of the present invention are directed to data visualization user interfaces with a summary popup that includes interactive objects to provide a user with supplemental information and thereby enable more efficient data analysis.

Some implementations provide instant and adaptive analytics in a data visualization user interface.

Some implementations provide a simplified process of conducting data analytics using a visual interface.

Additional features and advantages of implementations of the present invention will be set forth in the description that follows, and in part will be apparent from the description, or may be learned by practice of implementations of the present invention. The objectives and other advantages of the present invention may be realized and attained by the structure particularly pointed out in the written description and claims hereof as well as the appended drawings.

In accordance with some implementations, a method of visualizing a dataset is performed at a computer having a display, one or more processors, and memory storing one or more programs configured for execution by the one or more processors. The method includes displaying a first data visualization in a data visualization user interface according to user placement of data fields in shelves of the user interface. Each of the shelves specifies a respective property of the first data visualization, each of the data fields is from the dataset, and the first data visualization includes a plurality of visual data marks corresponding to data values for a plurality of the data fields in the dataset. The method includes detecting a first user input to select a subset of the visual data marks, and in response to detecting the first user input, displaying a popup summary that includes data value distributions for a plurality of the data fields. Each data value distribution indicates distribution of data values for a respective data field based on all visual data marks in the data visualization and also indicates distribution of data values for the same data field based on the selected subset of the visual data marks. The method includes detecting, in the popup summary, a second user input corresponding to a first data field whose data value distribution is displayed in the popup summary. In response to detecting the second user input, the method displays an interactive moveable icon (e.g., a "pill") corresponding to the first data field. The method detects a third user input to place the interactive moveable icon in one of the shelves in the user interface, and, in response to the third user input, displays a second data visualization according to placement of data fields, including the first data field, in shelves of the user interface.

In accordance with some implementations, a computer system for visualizing a dataset includes a display, one or more processors, and memory storing one or more programs. The one or more programs include instructions for performing any of the methods described herein.

In accordance with some implementations, a non-transitory computer readable storage medium stores one or more programs configured for execution by one or more processors of a computer system. The one or more programs include instructions that when executed by the one or more processors cause the computer system to perform any of the methods described herein.

Thus, methods, systems, and graphical user interfaces are disclosed that enable users to easily interact with data visualizations.

It is to be understood that both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Figure 1:
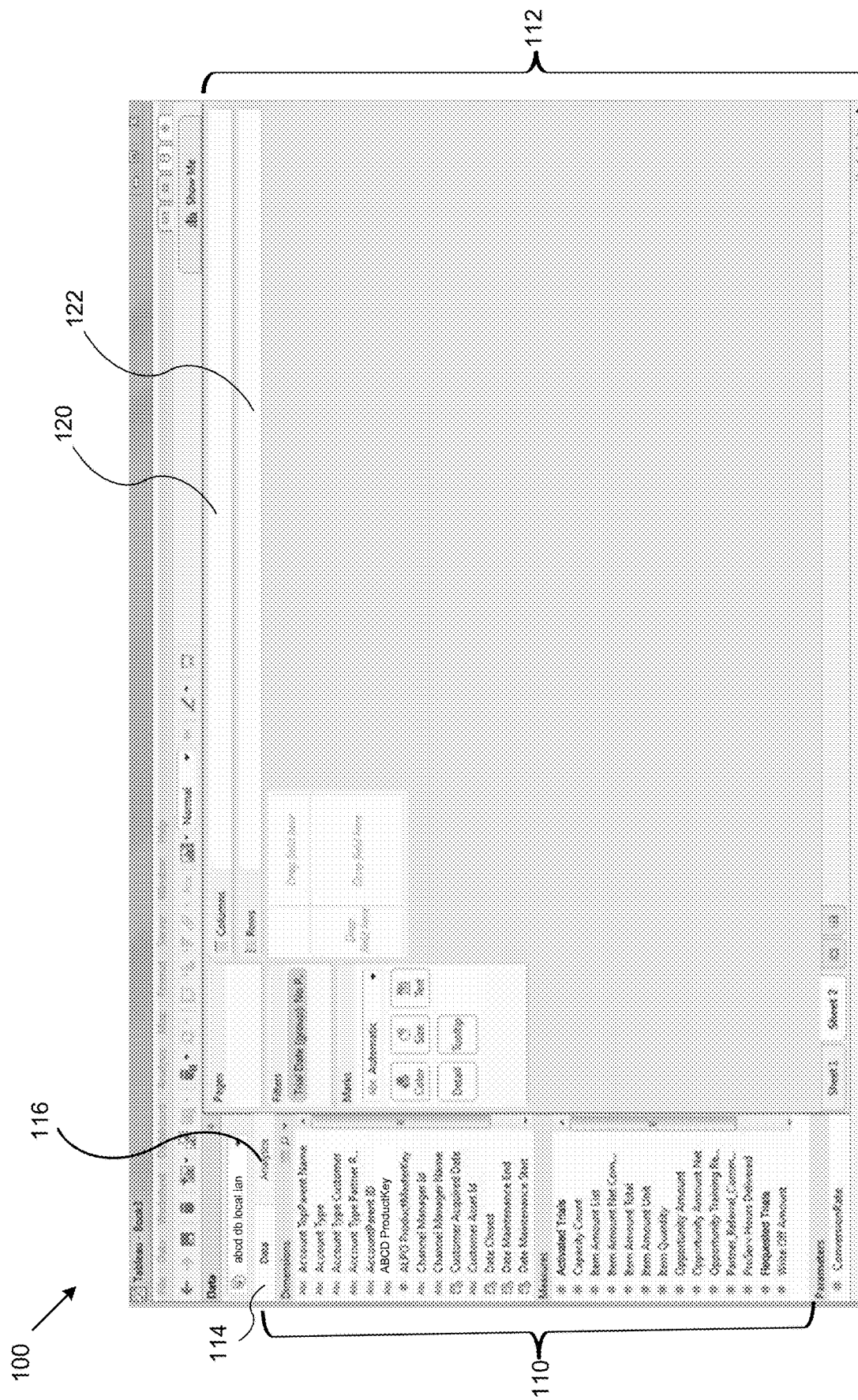
FIG. 1 illustrates a graphical user interface used in some example implementations.

FIG. 1 illustrates a graphical user interface 100 for interactive data analysis. The user interface 100 includes a Data tab 114 and an Analytics tab 116 in accordance with some example implementations. When the Data tab 114 is selected, the user interface 100 displays a schema information region 110, which is also referred to as a data pane. The schema information region 110 provides named data elements (e.g., field names) that may be selected and used to build a data visualization (sometimes referred to more generally as a visual graphic). In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated in FIG. 1, the data visualization region 112 also has a large space for displaying a visual graphic. Because no data elements have been selected in the example of FIG. 1, the space initially has no visual graphic. In some implementations, the data visualization region 112 has multiple layers that are referred to as sheets.

Figure 2:
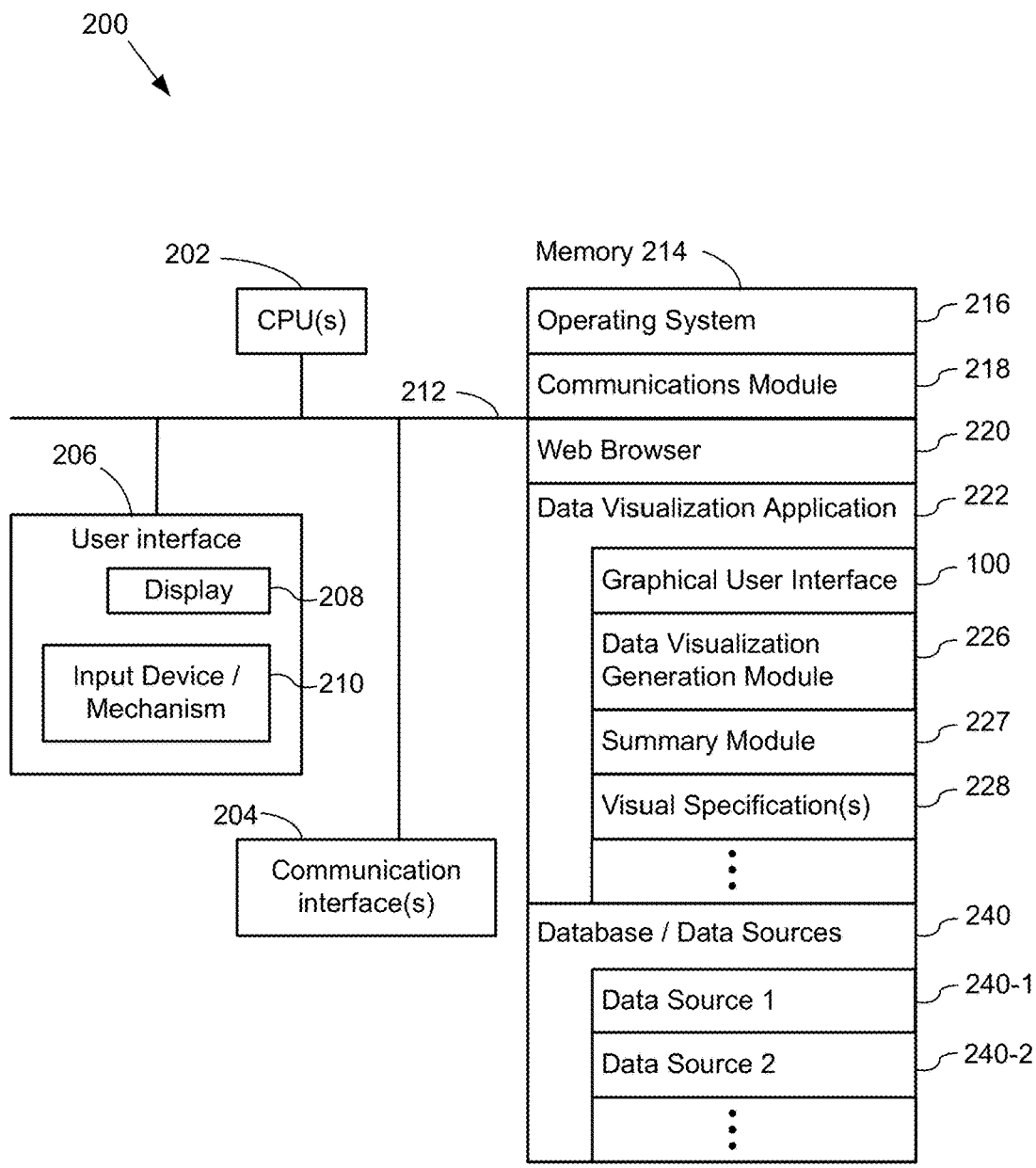
FIG. 2 is a block diagram of a computing device according to some implementations.

FIG. 2 is a block diagram illustrating a computing device 200 that can display the graphical user interface 100 in accordance with some implementations (e.g., for performing any of the methods described herein). Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 also includes a summary module 227, which is used for generating a summary of data fields selected by a user. In some implementations, the data visualization application 222 executes as a stand-alone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML, files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
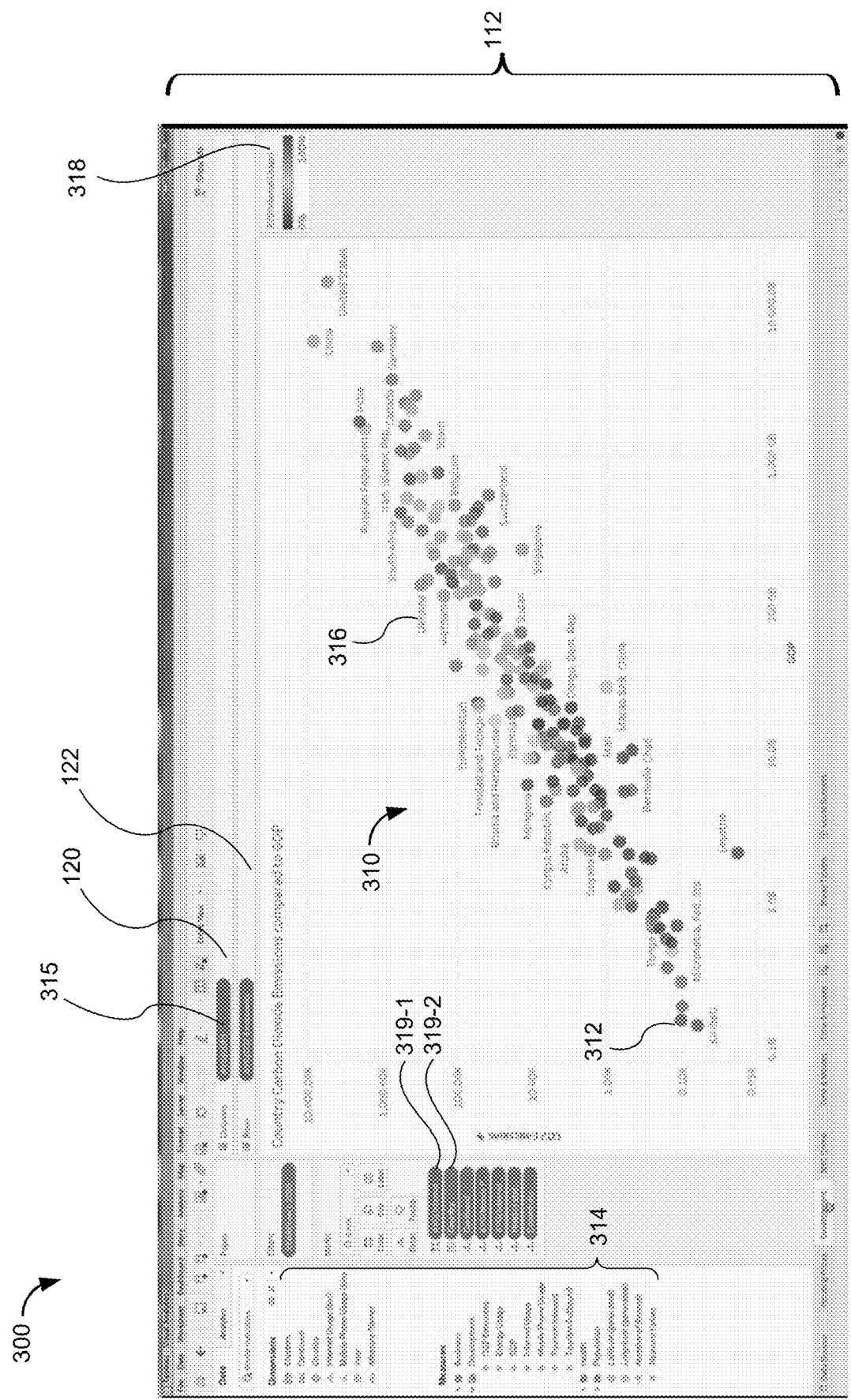
FIG. 3 illustrates a graphical user interface showing a scatter plot data visualization, in accordance with some implementations.

FIG. 3 illustrates an example graphical user interface 300 (e.g., graphical user interface 100, FIG. 1 or FIG. 2) showing a data visualization for interactive data analysis.

In FIG. 3, data (e.g., a dataset, which in some implementations is selected by a user) is displayed in a (first) data visualization in the form of scatter plot 310 (e.g., using data visualization generation module 226, FIG. 2). Although a scatterplot is used in this example, the features described herein apply to many types of data visualizations, such as bar charts, line charts, maps, pie charts, and so on. Scatter plot 310 includes a plurality of visual data marks (e.g., data mark 312) corresponding to data points (e.g., rows of the dataset). Each data mark 312 visually represents a point corresponding to one or more data fields selected for visualization (e.g., by a user). As shown in FIG. 3, data fields 314 may be displayed on a side of the data visualization region 112. In some implementations, data fields 314 may be associated with a category or group. For example, data fields 314 may be associated with and/or displayed within one of a group of dimensions (e.g., categorical data) and a group of measures (e.g., numeric quantities).

In the example shown in FIG. 3, each data mark 312 is plotted in an x-y scatter plot in accordance with data values associated with (e.g., stored in) first and second data fields (e.g., the data field "AVG(GDP)" and the data field "AVG (CO2 Emissions)"). In some implementations, the user may select the data fields for the x-axis and the y-axis. For example, a user can drag and drop a respective data field 314 (sometimes represented by a user interface element referred to as a "pill", such as pill 315) to the column shelf 120 (e.g., corresponding to the x-axis) and another respective data field (e.g., pill) 314 to the row shelf 122 (e.g., corresponding to the y-axis). A color of each data mark 312 may reflect a third data field (e.g., "Internet Usage," as indicated by legend 318), which in some implementations is selected by the user. Further, a text label 316 (e.g., "Ukraine") may reflect a fourth data field (e.g., a "Country" data field), which in some implementations is selected by the user. Those of ordinary skill in the art will recognize that the dataset may include additional data fields for data marks 312 not shown in scatter plot 310 of FIG. 3.

In some implementations, a user may use data fields to encode characteristics of the data marks. For example, FIG. 3 illustrates data pill 319-1, corresponding to the data field labeled "AVG(Internet Usage)", which is used for "Color" encoding. FIG. 3 also illustrates data pill 319-2, labeled "Country", which is used for "Label" encoding. Accordingly, in the example shown in FIG. 3, each respective data mark 312 is displayed using a color encoding representing a corresponding respective data value for the "AVG(Internet Usage)" data field. A respective data mark 312 is also displayed with a text label representing a corresponding respective data value for the "Country" data field.

Figure 4:
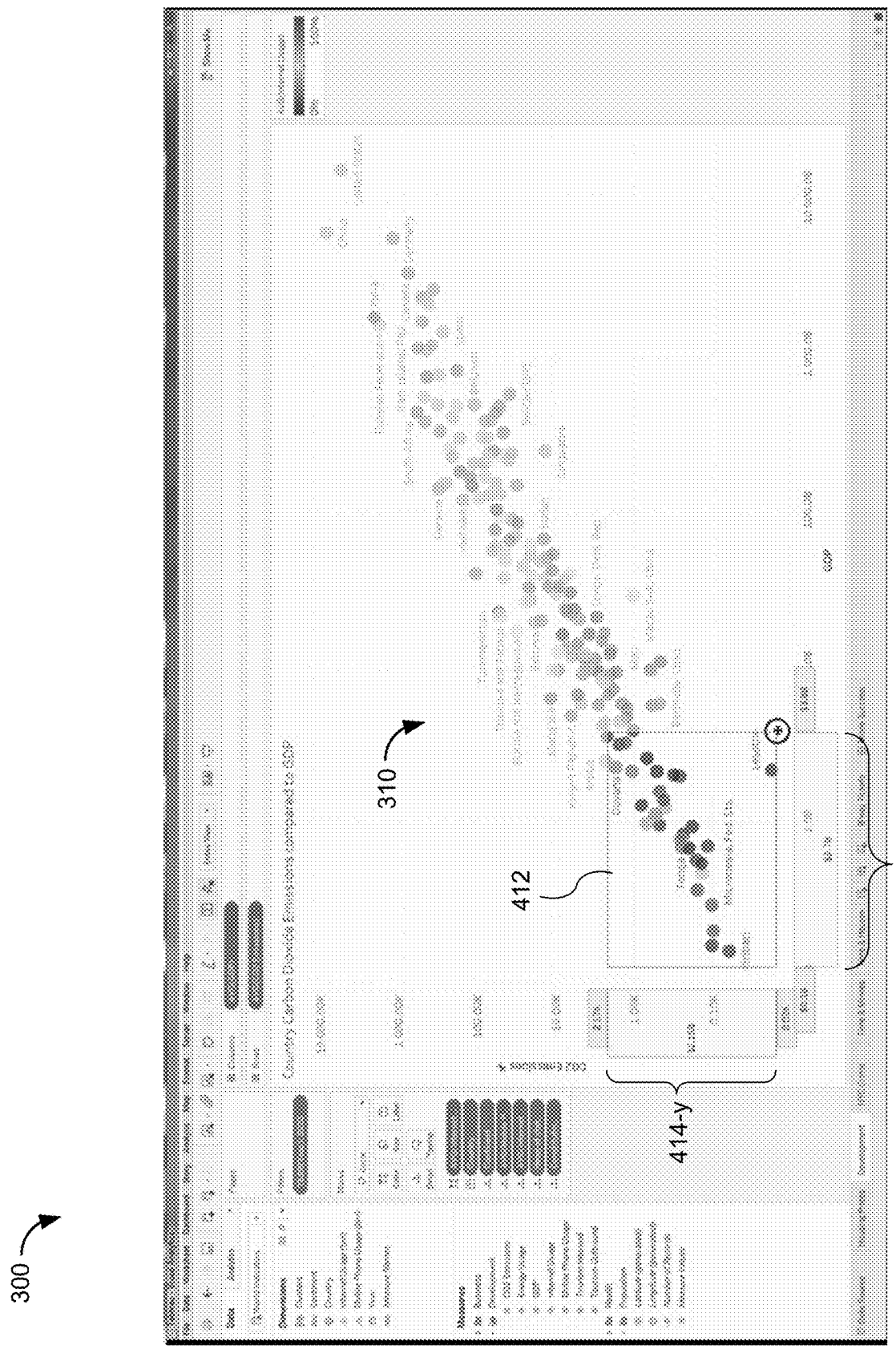
FIGS. 4-8 illustrates a graphical user interface in which a user interacts with performs interactive data analysis, in accordance with some implementations.

FIGS. 4-8 illustrate a series of transitions of graphical user interface 300 in accordance with user interactions with the scatter plot of FIG. 3 for interactive data analysis. Implementations apply the same process to other types of data visualizations as well As shown in FIG. 4, a user may select a subset of the data marks 312 displayed in the scatter plot 310. For example, in response to a user input such as a drag gesture, a visual selection indication (e.g., a frame or a box) is displayed over the selected portion 412 of the scatter plot 310 (e.g., as an overlay). In some implementations, the visual selection indication changes (e.g., the box increases or decreases in size) in accordance with movement of the user input (e.g., in accordance with movement of the computer cursor in response to the user input). The bounds of the selected portion 412 may be reflected on the x-axis and the y-axis (e.g., in some implementations range indicator 414-x indicates a range of the x-axis corresponding to the selected portion 412 of scatter plot 310, and in some implementations range indicator 414-y indicates a range of the y-axis corresponding to the selected portion 412 of scatter plot 310).

In some implementations, a visual appearance (e.g., a brightness) of data marks (or portions of data marks) within selected portion 412 is changed to indicate the selection of those data marks (or portions of data marks). In some implementations, a visual appearance (e.g., brightness) of data marks (or portions of data marks) outside of selected portion 412 is changed to indicate that those data marks (or portions of data marks) are not selected. For example, FIG. 3 illustrates that, prior to receiving user selection of the subset of the data marks 312, data marks 312 are displayed with a first brightness. In another example, FIG. 4 illustrates that, in accordance with detecting the user input to select a subset of displayed data marks, data marks inside selected portion 412 are displayed with a second brightness (e.g., the same as the first brightness), while data marks outside selected portion 412 are displayed with a third brightness (e.g., dimmer than the first brightness). Those of ordinary skill in the art will recognize that the visual appearances of the selected data marks and the unselected data marks may be changed in other ways that illustrate a contrast between selected data marks and unselected data marks. In some implementations, the visual appearances of the selected data marks and the unselected data marks are changed while detecting the user input (e.g., while continuing to detect movement of the user input, the visual appearances of the selected data marks and the unselected data marks are changed on the fly in accordance with changes in the selected area of scatter plot 310 corresponding to the movement of the user input).

Figure 5:
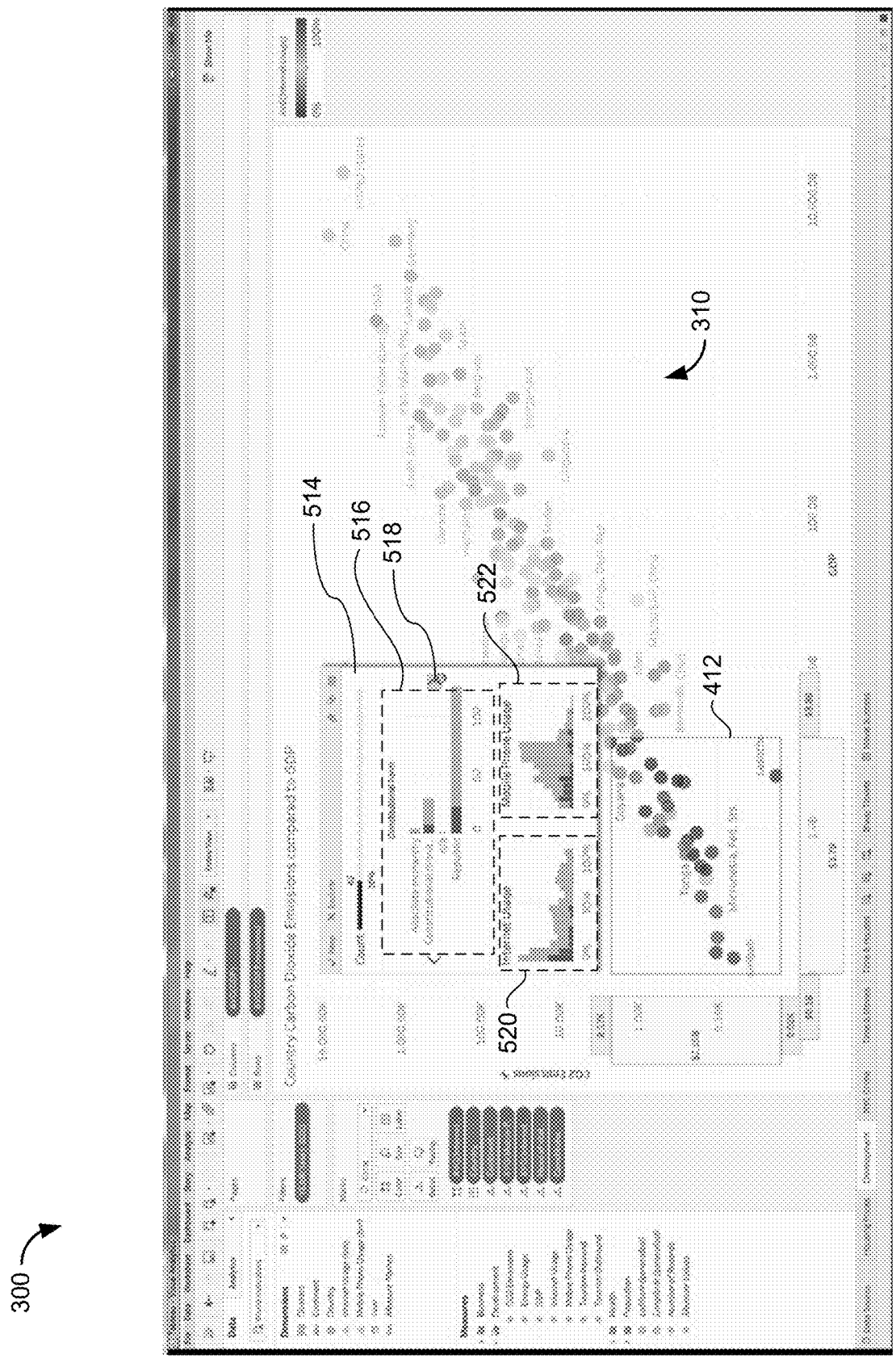

As shown in FIG. 5, in response to detecting the user input selecting a subset of the data marks, an instant summary popup 514 is displayed (e.g., using summary module 227, FIG. 2). In some implementations, instant summary popup 514 is displayed over at least a portion of the first data visualization (e.g., as an overlay).

In some implementations, the instant summary popup 514 includes data value distributions for some of the data fields. In fact, each distribution shows two superimposed distributions. The first shows the distribution of data values for the data field corresponding to all of the visual data marks. The second shows the distribution of data values for just the selected set of data marks. For example, the region 520 in FIG. 5 shows data value distribution for Internet usage. The lighter bars in the distribution show percentages of people with Internet usage based on the full data set (all of the marks). The darker bars superimposed over the lighter bars show the distribution for just the data corresponding to the selected data marks 412. Similarly, region 522 shows the distribution of mobile phone usage. The upper region 516 in the instant summary popup 514 shows the number of data marks corresponding to each "Constitutional form." Again, the lighter bars correspond to all data marks in the data visualization 310, whereas the darker bars correspond to just the selected data marks 412.

In some implementations, one or more of the data field distributions displayed in the instant summary popup 514 correspond to one or more data fields for which an encoding has been specified (e.g., as described above with reference to data pills 319-1 and 319-2, FIG. 3). In some implementations, one or more data fields displayed in the summary popup 514 are distinct from data fields used in the first data visualization. For example, in FIG. 5, the upper region 516 uses the data field "Constitutional Form," which is not one of the data fields displayed in scatter plot 310.

In some implementations, while the summary is displayed, the user can move or adjust the selected portion 412, either by moving the selected region, or by adding or removing individual data marks (e.g., clicking to deselect a data mark in the region or clicking to select a data mark outside of the selected region). As the set of selected marks changes, the summary updates continuously.

Figure 6:
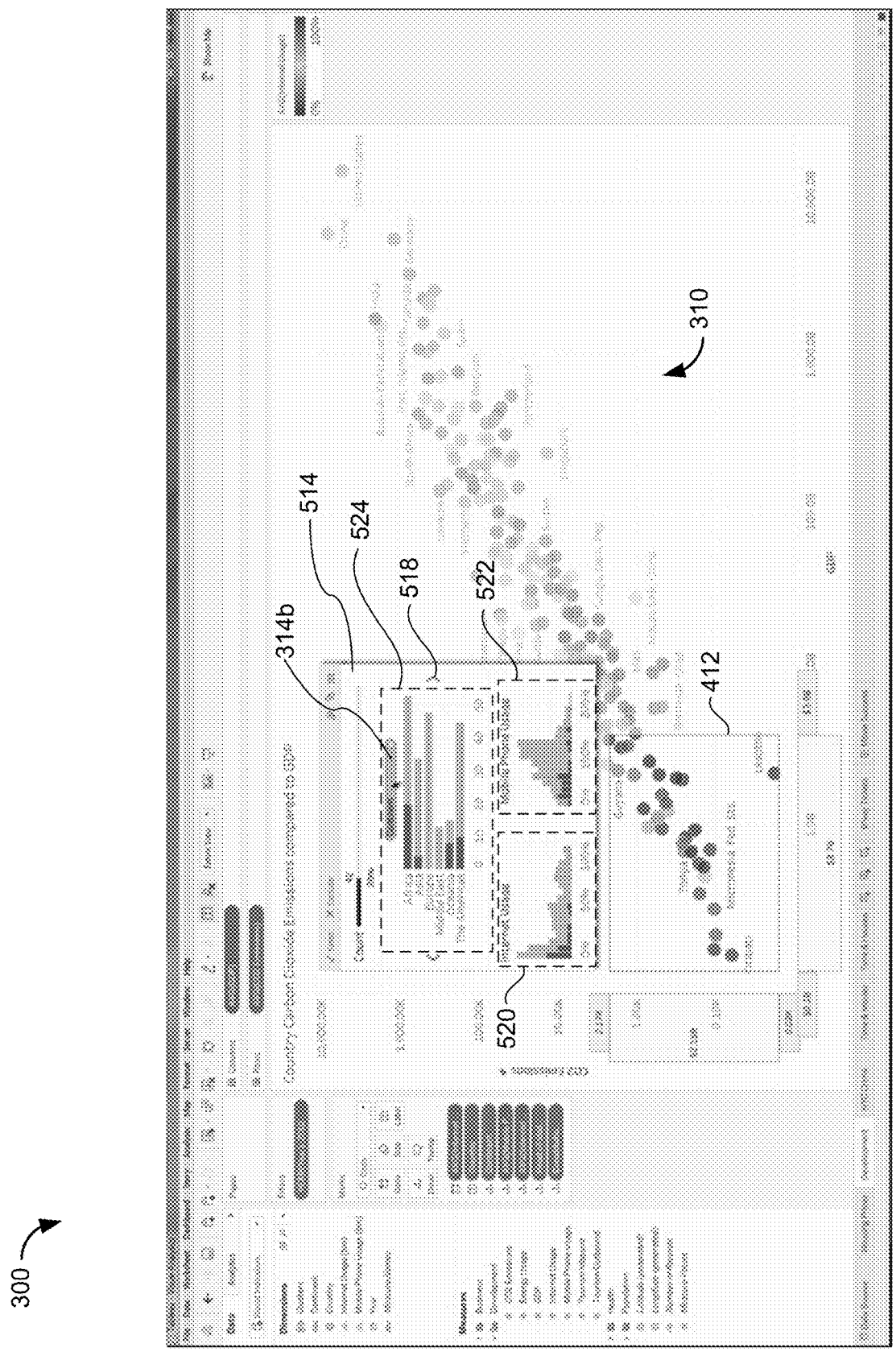
Figure 7:
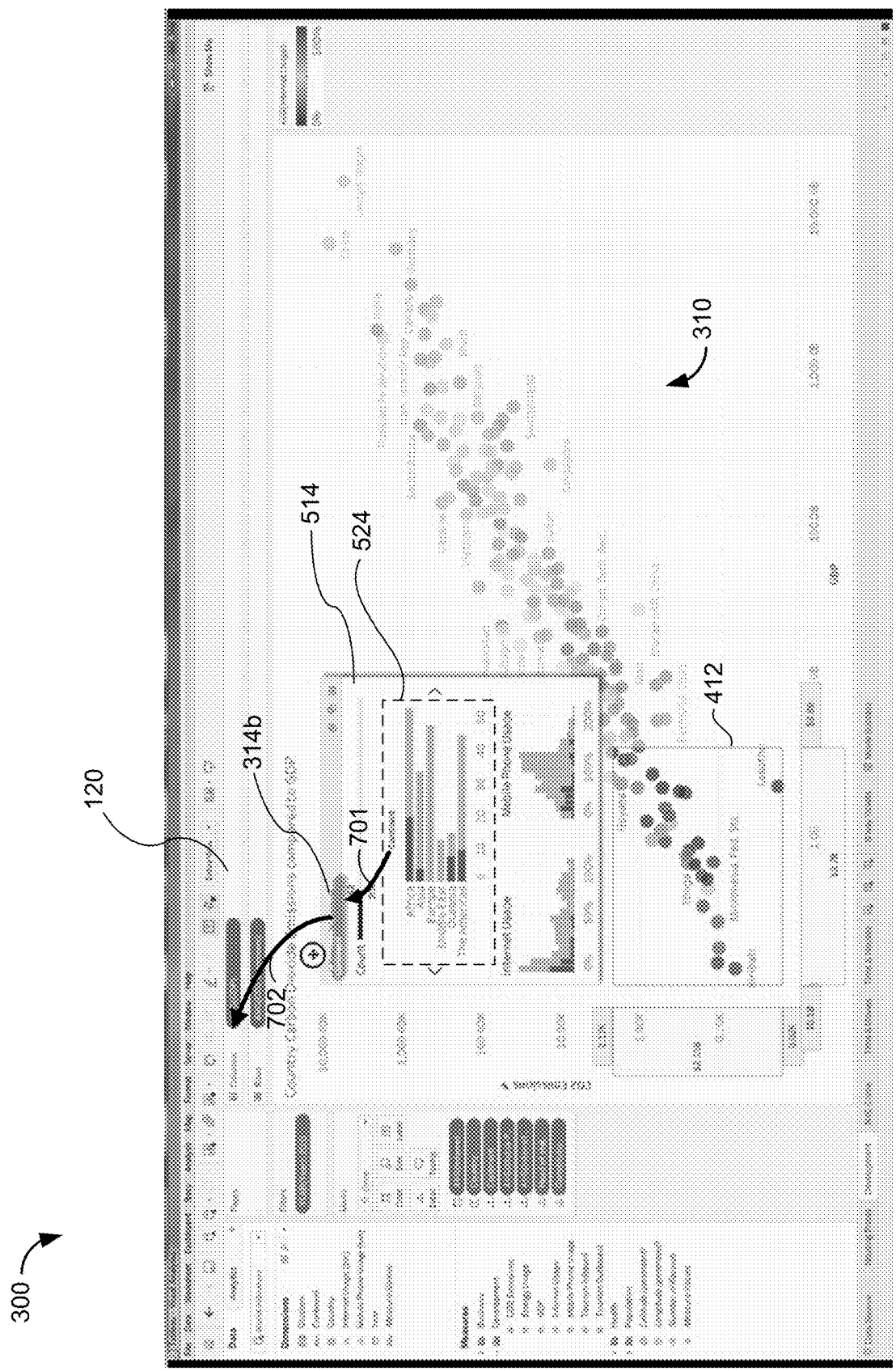

In some implementations, the instant summary popup 514 includes one or more navigation buttons 518 to toggle through additional data field distributions. For example, FIG. 6 illustrates the graphical user interface 300 in response to a user input corresponding to navigation button 518 (e.g., a user clicking or tapping on navigation button 518). As shown in FIG. 6, the instant summary popup 514 displays distribution data 524 corresponding to the data field 314b, labeled "Continent". In some implementations, if additional analytics are desired for a data field displayed in the instant summary popup 514, the user interface element 314b corresponding to the data field can be selected by the user. For example, FIG. 6 illustrates a user input corresponding to selection of data pill 314b in the distribution 524 of the instant summary popup 514. FIG. 7 illustrates that, in accordance with movement of the user input, the data pill 314b is dragged to a shelf (e.g., column shelf 120), as shown by arrows 701 and 702 in FIG. 7. In response to the selection of an additional data field (e.g., the selection of the data field labeled "Continent," by the addition of data pill 314b to column shelf 120), the first data visualization is updated based on the selected data fields (e.g., using data visualization generation module 226, FIG. 2). Depending on the shelf where the pill 314b is placed, a new data visualization may be generated and displayed, as shown in FIG. 8.

Figure 8:
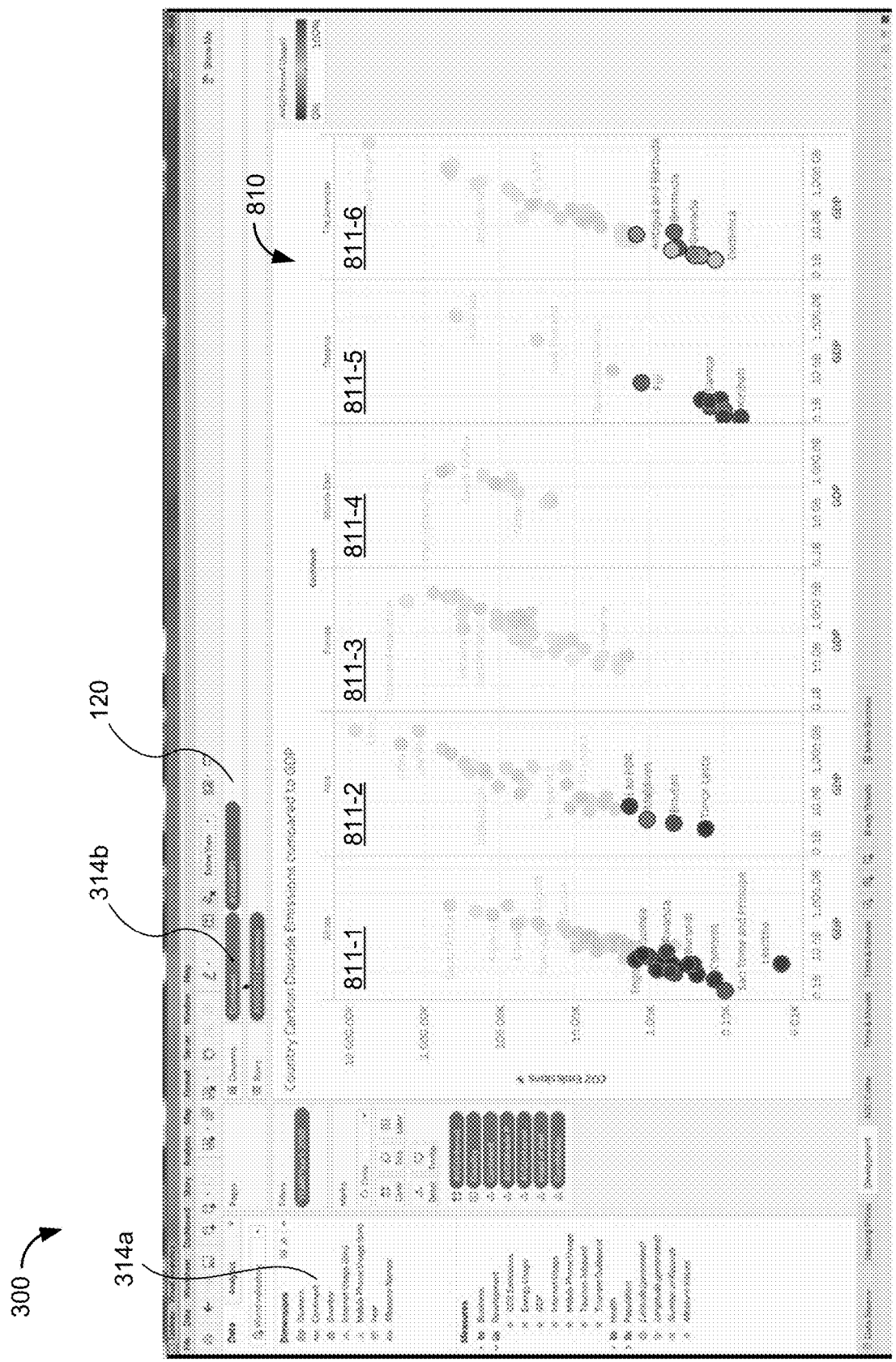

FIG. 8 illustrates a transition of the graphical user interface 300 from the graphical user interface 300 in FIG. 7, in accordance with the addition of a data field (e.g., adding the data field labeled "Continent" to the column shelf 120 from instant summary popup 514). In FIG. 8, data corresponding to selected data fields is displayed in a second data visualization in the form of a small multiple scatter plot 810 (e.g., scatter plot 310, FIG. 7, is updated to scatter plot 810, FIG. 8). It is noted that scatter plot 810 may alternatively be generated by dragging and dropping the data field label 314a (labeled "Continent") from the data pane 110 to column shelf 120 (e.g., rather than dragging and dropping data pill 314b from instant summary popup 514). The use of instant summary popup 514 to provide additional data analytics reduces the number and extent of user inputs required to understand and analyze data, and enables more efficient analysis of data.

The small multiple scatter plot 810 includes a plurality of panes 811-1, 811-2, through 811-6, each corresponding to a different value of the Continent data field. This is in accordance with having the two data fields ("Continent" and "GDP") on the column shelf 120. In the example shown in FIG. 8, each pane 811-1, 811-2, through 811-6 represents a respective data value associated with the "Continent" data field (e.g., a dimension). For example, for each data value, a value of the "Continent" data field is one of the following: "Africa," "Asia," "Europe," "Middle East," "Oceania," and "The Americas." In some implementations, data points having a respective value for a dimension-type (e.g., categorical) data field are displayed in the respective data visualization region corresponding to that respective value (or category). For example, data points having a value "Africa" for the "Continent" data field are displayed in pane 811-1 corresponding to the value "Africa," data points having a value "Asia" for the "Continent" data field are displayed in pane 811-2 corresponding to the value "Asia," and so on. In some implementations, the respective x-axes of each data visualization region correspond to data values associated with a measures-type (e.g., numeric) data field. For example, the respective x-axes of each pane 811 correspond to data values associated with the "AVG(GDP)" data field (e.g., a measure) (e.g., the respective x-axes span a range of data values including at least the data values associated with the "AVG(GDP)" data field).

In some implementations, the visual appearance of a respective data mark displayed in the small multiple scatter plot 810 corresponds (e.g., is consistent with) the visual appearance for a corresponding data mark in the scatter plot 310. For example, referring again to FIG. 7, data marks in the selected portion 412 are highlighted, and the data marks not in the region 412 are dimmed. Accordingly, in some implementations, data marks in the small multiple scatter plot 810 that correspond to the data marks in selected portion 412 (FIG. 7) are highlighted, and the other data marks in the small multiple scatter plot 810 are dimmed.

Figure 9:
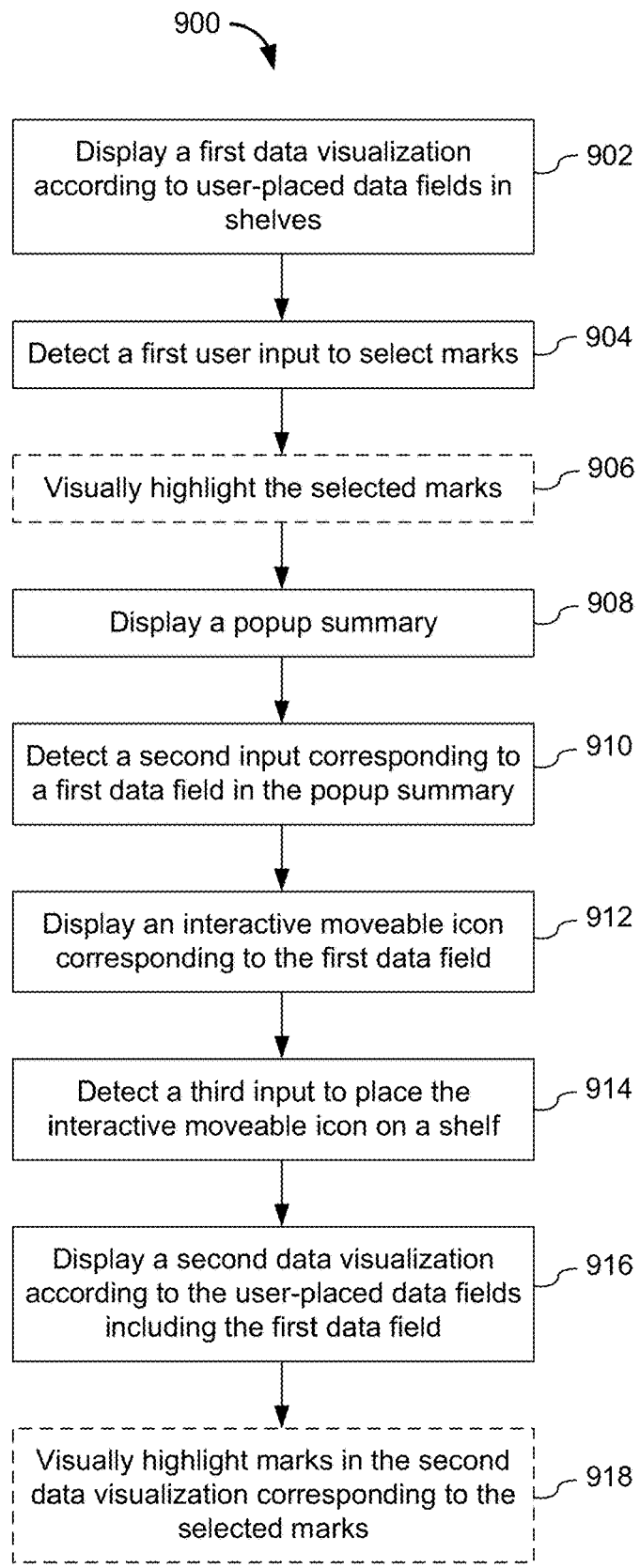
FIG. 9 is a flowchart for a process of using an interactive summary popup to dynamically analyze a data set in accordance with some implementations.

FIG. 9 provides a flowchart 900 for a process of using an interactive summary popup to dynamically analyze a data set in accordance with some implementations. The process is typically performed at a computer 200 having a display 208, one or more processors 202, and memory 214 storing one or more programs configured for execution by the one or more processors.

The process 900 displays (902) a first data visualization (e.g., a scatterplot 310 as illustrated in FIG. 3) according to user-placed data field in shelves of the user interface (e.g., the field AVG(GDP) 315 in the columns shelf 120 in FIG. 3). The shelves specify various properties of the data visualization, such as x and y position (e.g., the columns and rows shelves 120 and 122 in FIG. 3) or various data mark encodings (e.g., color encoding 319-1 or label encoding 319-2 in FIG. 3).

The process detects (904) a first user input to select marks, as illustrated by the selection box 412 in FIG. 4. In some implementations, a user can select marks by clicking to select/unselect individual marks or use a lasso tool for selection. In some implementations, the process 900 visually highlights (906) the selected marks, as illustrated in FIG. 4. In some implementations, "highlighting" the selected marks is performed by dimming the unselected marks.

The process displays (908) a popup summary, such as the summary 514 in FIG. 5. The popup summary 514 display data value distributions for some of the data fields in the data set, such as the first distribution 516 for the data field "Constitutional Form," the second distribution 520 for the data field "Internet Usage," and the third distribution 522 for the data field "Mobile Phone Usage."

The process detects (910) a user input corresponding to one of the displayed data fields in the popup summary, as illustrated by the touch 314b on the data field "Continent" in FIG. 6. In response, the process displays (912) an interactive moveable icon 314b corresponding to the data field selected by the user.

The process then detects (914) further user input to place the interactive moveable icon on a shelf in the user interface. FIG. 7 illustrates placing the moveable icon onto the columns shelf 120.

Based on the user placement of the moveable icon onto a shelf, the process displays (916) a second data visualization according to the user-placed data fields, including the data field just placed onto a shelf by the user. This is illustrated in FIG. 8, where the second data visualization 810 is actually a plurality of smaller data visualizations, each corresponding to one of the continents.

In some implementations, the process visually highlights (918) marks in the second data visualization corresponding to the marks that were previously selected. This is illustrated in FIG. 8.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of visualizing a dataset, comprising:
   at a computer having a display, one or more processors, and memory storing one or more programs configured for execution by the one or more processors:
   displaying a first data visualization in a data visualization user interface according to user placement of data fields in shelves of the user interface, wherein each of the shelves specifies a respective property of the first data visualization, each of the data fields is from the dataset, and the first data visualization includes a plurality of visual data marks corresponding to data values for data fields in the dataset;
   detecting a first user input to select a subset of the visual data marks;
   in response to detecting the first user input, displaying a popup summary that includes data value distributions for a plurality of the data fields, wherein each data value distribution indicates distribution of data values for a respective data field based on all visual data marks in the data visualization and also indicates distribution of data values for the respective data field based on the selected subset of the visual data marks;
   detecting, in the popup summary, a second user input corresponding to a first data field whose data value distribution is displayed in the popup summary;
   in response to detecting the second user input, displaying an interactive moveable icon corresponding to the first data field;
   detecting a third user input to place the interactive moveable icon in one of the shelves in the user interface; and
   in response to the third user input, displaying a second data visualization according to user placement of data fields, including the first data field, in the shelves of the user interface.

2. The method of claim 1, further comprising, in response to detecting the first user input, visually highlighting the selected subset of the visual data marks.

3. The method of claim 1, further comprising in response to detecting the third user input, visually highlighting visual data marks in the second data visualization corresponding to the selected subset of the visual data marks in the first data visualization.

4. The method of claim 1, wherein, for each data value distribution displayed in the popup summary, the distribution of data values for the respective data field based on the selected subset of the visual data marks is visually highlighted relative to the distribution of data values for the respective data field based on all visual data marks.

5. The method of claim 1, wherein the popup summary is displayed over at least a portion of the first data visualization.

6. The method of claim 1, further comprising:
   while displaying the popup summary, detecting a fourth user input to modify the selected subset of the visual data marks to include or exclude one or more visual data marks from the selected subset; and
   in response to detecting the fourth user input, updating display of the popup summary in accordance with the modification of the selected subset.

7. The method of claim 1, wherein the popup summary includes a data value distribution for a data field distinct from the data fields in the shelves of the user interface.

8. The method of claim 1, wherein the popup summary includes data value distributions for data fields that have been used for one or more data mark encodings.

9. A computer system for visualizing a dataset, comprising:
   a display;
   one or more processors; and
   memory storing one or more programs, wherein the one or more programs are configured for execution by the one or more processors and include instructions for:
   displaying a first data visualization in a data visualization user interface according to user placement of data fields in shelves of the user interface, wherein each of the shelves specifies a respective property of the first data visualization, each of the data fields is from the dataset, and the first data visualization includes a plurality of visual data marks corresponding to data values for data fields in the dataset;
   detecting a first user input to select a subset of the visual data marks;
   in response to detecting the first user input, displaying a popup summary that includes data value distributions for a plurality of the data fields, wherein each data value distribution indicates distribution of data values for a respective data field based on all visual data marks in the data visualization and also indicates distribution of data values for the respective data field based on the selected subset of the visual data marks;

detecting, in the popup summary, a second user input corresponding to a first data field whose data value distribution is displayed in the popup summary;

in response to detecting the second user input, displaying an interactive moveable icon corresponding to the first data field;

detecting a third user input to place the interactive moveable icon in one of the shelves in the user interface; and in response to the third user input, displaying a second data visualization according to user placement of data fields, including the first data field, in the shelves of the user interface.

10. The computer system of claim 9, further comprising, in response to detecting the first user input, visually highlighting the selected subset of the visual data marks.

11. The computer system of claim 9, further comprising in response to detecting the third user input, visually highlighting visual data marks in the second data visualization corresponding to the selected subset of the visual data marks in the first data visualization.

12. The computer system of claim 9, wherein, for each data value distribution displayed in the popup summary, the distribution of data values for the respective data field based on the selected subset of the visual data marks is visually highlighted relative to the distribution of data values for the respective data field based on all visual data marks.

13. The computer system of claim 9, wherein the popup summary is displayed over at least a portion of the first data visualization.

14. The computer system of claim 9, further comprising:
  while displaying the popup summary, detecting a fourth user input to modify the selected subset of the visual data marks to include or exclude one or more visual data marks from the selected subset; and,
  in response to detecting the fourth user input, updating display of the popup summary in accordance with the modification of the selected subset.

15. The computer system of claim 9, wherein the popup summary includes a data value distribution for a data field distinct from the data fields in the shelves of the user interface.

16. The computer system of claim 9, wherein the popup summary includes data value distributions for data fields that have been used for one or more data mark encodings.

17. A non-transitory computer readable storage medium storing one or more programs configured for execution by one or more processors of a computer system, the one or more programs including instructions that when executed by the one or more processors cause the computer system to:
  display a first data visualization in a data visualization user interface according to user placement of data fields in shelves of the user interface, wherein each of the shelves specifies a respective property of the first data visualization, each of the data fields is from the dataset, and the first data visualization includes a plurality of visual data marks corresponding to data values for data fields in the dataset;

detect a first user input to select a subset of the visual data marks;

in response to detecting the first user input, display a popup summary that includes data value distributions for a plurality of the data fields, wherein each data value distribution indicates distribution of data values for a respective data field based on all visual data marks in the data visualization and also indicates distribution of data values for the respective data field based on the selected subset of the visual data marks;

detect, in the popup summary, a second user input corresponding to a first data field whose data value distribution is displayed in the popup summary;

in response to detecting the second user input, display an interactive moveable icon corresponding to the first data field;

detect a third user input to place the interactive moveable icon in one of the shelves in the user interface; and in response to the third user input, display a second data visualization according to user placement of data fields, including the first data field, in the shelves of the user interface.

18. The computer readable storage medium of claim 17, further comprising in response to detecting the third user input, visually highlighting visual data marks in the second data visualization corresponding to the selected subset of the visual data marks in the first data visualization.

19. The computer readable storage medium of claim 17, wherein, for each data value distribution displayed in the popup summary, the distribution of data values for the respective data field based on the selected subset of the visual data marks is visually highlighted relative to the distribution of data values for the respective data field based on all visual data marks.

20. The computer readable storage medium of claim 17, wherein the popup summary includes a data value distribution for a data field distinct from the data fields in the shelves of the user interface.

* * * * *